United States Patent [19]

Rivard et al.

[11] Patent Number: 5,449,193
[45] Date of Patent: Sep. 12, 1995

[54] END LINK FOR A VEHICLE STABILIZER BAR

[75] Inventors: Corey M. Rivard, Batavia; Eric G. Parker, Elgin, both of Ill.

[73] Assignee: Illinois Tool Works Inc., Glenview, Ill.

[21] Appl. No.: 98,224

[22] Filed: Jul. 27, 1993

[51] Int. Cl.⁶ ............................................. B60G 11/50
[52] U.S. Cl. ............................................... 280/689
[58] Field of Search ............... 280/689; 411/160, 161, 411/957, 959, 546, 354; 403/13, 14

[56] References Cited

U.S. PATENT DOCUMENTS

| | | | |
|---|---|---|---|
| 3,164,418 | 1/1965 | Biesecker | 411/354 |
| 3,314,699 | 4/1967 | Taylor | 403/14 |
| 3,579,942 | 5/1971 | Cole | 411/959 |
| 4,747,737 | 5/1988 | Roffelsen | 411/546 |
| 4,778,321 | 10/1988 | Okawa | 411/546 |
| 4,944,523 | 7/1990 | Hardy, Jr. et al. | 280/689 |

*Primary Examiner*—Karin L. Tyson
*Attorney, Agent, or Firm*—Trexler, Bushnell, Giangiorgi & Blackstone, Ltd.

[57] ABSTRACT

An end link for a stabilizer bar of a vehicle suspension system is disclosed as having three preassembled subassemblies. One subassembly includes a bolt, a washer, and a grommet, and an opposite end subassembly includes a grommet, a washer, and a nut. An intermediate subassembly includes a plastic tubular spacer body having opposite ends closed by plastic end caps fixed to the tubular body by axially projecting fingers or abutments, which also serve to resist deflection of the end caps. The intermediate subassembly also includes grommets fixed to the end caps.

18 Claims, 2 Drawing Sheets

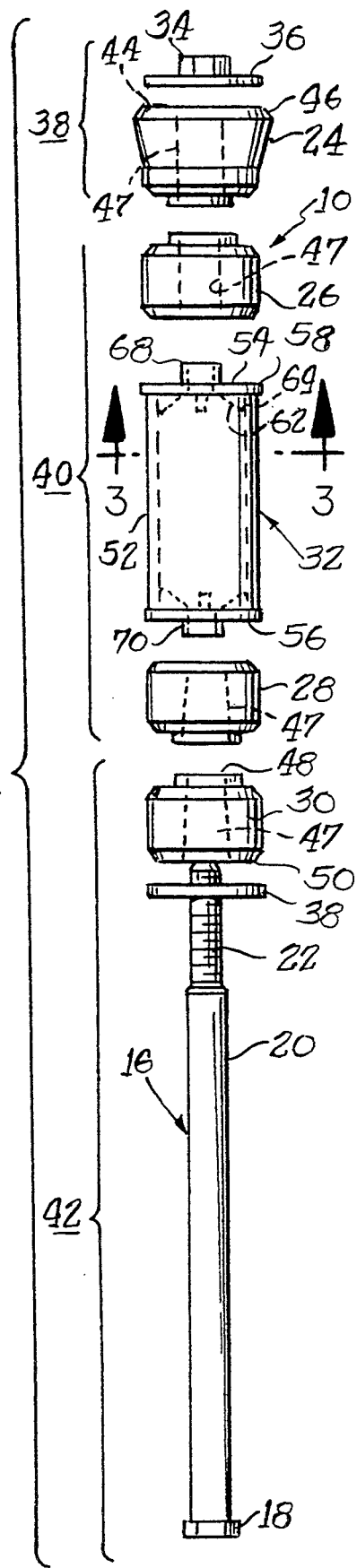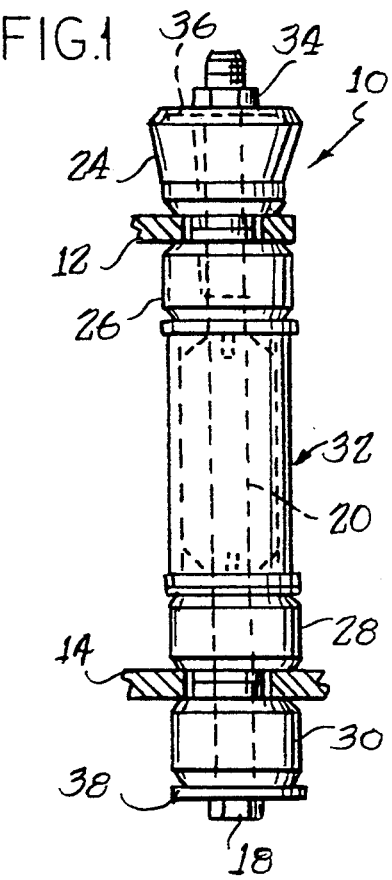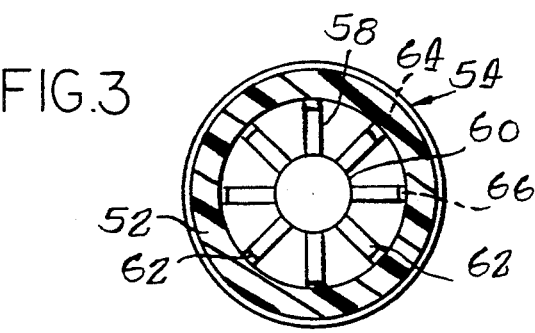

END LINK FOR A VEHICLE STABILIZER BAR

The present invention relates to an end link for a stabilizer bar used in a suspension system for a vehicle, such as an automobile or a light truck.

BACKGROUND OF THE INVENTION

Suspension systems of the type contemplated herein usually include a stabilizer bar, a control element, and an end link connecting an end of the stabilizer bar with the control element so as to transmit forces therebetween. Such end links have included pairs of grommets respectively embracing the stabilizer bar and the control element, a connecting rod or bolt extending through such grommets, and a spacer mounted on an intermediate portion of the bolt between innermost grommets for maintaining a desired space between the stabilizer bar and the control element.

A suspension system and an end link of the above-described type are disclosed in U.S. Pat. No. 4,944,523, assigned to the assignee of the present application, which disclosure is incorporated herein by reference. Among the advantages of the end link structure of U.S. Pat. No. 4,944,523 was the structure which enabled the unit to be arranged in a few preassembled subassemblies, so that installation in the suspension on a vehicle production line was greatly simplified.

In the patent, the intermediate spacer is disclosed as a spool formed with a tubular steel body and annular steel flanges at its opposite ends. The tubular body is disclosed as being formed from a flat piece of steel stock with an axial seam. As will be understood, suspension systems of vehicles, such as automobiles, are frequently subjected to corrosive elements, such as salt, water, snow, and the like. Such elements may prematurely corrode the normally exposed parts of the end link, such as the metal tube and flanges of the intermediate spool, and may also enter within the spool and cause corrosion of the connecting rod or bolt.

SUMMARY OF THE INVENTION

An object of the present invention is to provide a novel end link having the advantages of the structure disclosed in U.S. Pat. No. 4,944,523, and further constructed so as to reduce corrosion of the structure.

A more specific object of the present invention is to provide a novel end link of the above-described type having an intermediate spool or spacer constructed so as to eliminate corrosion thereof, and so as to protect the portions of the bolt or connecting rod extending therethrough.

A still further specific object of the present invention is to provide a novel end link of the above-described type, wherein the intermediate spool or spacer is of simple construction and may be economically fabricated.

An end link incorporating features of the present invention comprises a bolt or connecting rod having pairs of grommets disposed on opposite end portions thereof respectively for embracing a stabilizer bar of a suspension system and a control element. An intermediate spool or spacer is disposed between the innermost grommets and is constructed of plastic or other corrosion-resistant material, and in a manner for easy assembly and for sealing the interior of the spacer for preventing corrosion of the portions of the bolt extending therethrough. Specifically, the spacer may be formed from a piece of seamless plastic tubing having opposite ends sealed by plastic or non-corrosive caps.

Other objects and advantages of the present invention will become apparent from the following description and the accompanying drawings.

BRIEF DESCRIPTION OF THE DRAWINGS

FIG. 1 is an elevational view showing an end link incorporating features of the present invention fully assembled and embracing portions of a stabilizer bar and a control element, portions of which are shown in cross-section;

FIG. 2 is an exploded side elevational view of the end link shown in FIG. 1;

FIG. 3 is an enlarged sectional view taken along line 3—3 in FIG. 2;

DETAILED DESCRIPTION OF AN ILLUSTRATIVE EMBODIMENT

Figure 4:
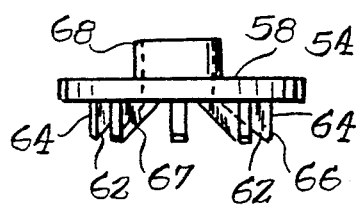
FIG. 4 is an enlarged side elevational view of an end cap assembled in the spacer or spool of an end link incorporating features of the present invention.

Referring now more specifically to the drawings, wherein like parts are designated by the same numerals throughout the various figures, an end link 10 incorporating features of the present invention is shown in FIGS. 1 and 2. The end link is adapted to be assembled with a stabilizer bar 12 and a control element 14 of a vehicle suspension of known construction. Reference is again made to U.S. Pat. No. 4,944,523 for a more detailed disclosure of such a vehicle suspension.

In the embodiment shown, the end link comprises a connector bar 16, which may be in the form of a bolt having an abutment or a head 18 at one end thereof. An elongated rod or shank extends axially from the head 18 and includes a first unthreaded portion 20 having a first predetermined diameter and a threaded end portion 22.

As shown in FIG. 1, a first pair of grommets 24 and 26 is assembled with the bolt in the manner described more in detail below for embracing and retaining the stabilizer bar 12. A second pair of grommets 28 and 30 is also assembled with the bolt, as described more in detail below, for embracing and retaining the control element 14. An intermediate spool or spacer 32 is also mounted on the bolt for engaging and supporting the innermost grommets 26 and 28, and thereby maintaining the desired spacing between the stabilizer bar and the control element 14. A nut 34 is applied to the threaded end portion 22 of the bolt for maintaining the parts in assembled relationship. Preferably, a first washer 36 fabricated from metal is disposed between the nut 34 and an end of the grommet 24. A second similar washer 38 is disposed between the bolt head or abutment 18 and the grommet 30.

Referring now to FIG. 2, it is seen that the parts are adapted to be arranged in three subassemblies 38, 40, and 42. By preassembling the parts in the subassemblies before delivery to a vehicle assembly line, final installation is greatly simplified and substantial savings in production costs can be achieved, as disclosed in the above-mentioned patent.

Specifically, the subassembly 38 comprises the nut 34 and washer 36, which are connected together as a unit in accordance with well-known techniques. In the embodiment shown, the grommet 24 is formed with an end pocket 44, defined by flange 46, into which the washer 36 may be snapped for maintaining the parts in the subassembly 38.

The subassembly 42 is also easily put together by simply sliding the washer 36 over the shank of the bolt until it engages the head 18. Then, the grommet 30 is slipped onto the bolt shank. It is noted that the grommet 30, as well as all of the other grommets, is molded of an elastomeric material, such as natural or synthetic rubber, or from a suitable resilient, tough plastic. Furthermore, the grommet 30 has an internal bore 47 having a diameter at an end 48 thereof which is similar to the diameter of the unthreaded shank portion 20, so that there will be sufficient frictional engagement between the inner wall of the grommet and the bolt shank for retaining the parts in preassembled relationship. Preferably, the bore 47 is tapered so that it has a diameter at an end 50 thereof opposite from the end 48 sufficiently larger than the diameter of the unthreaded shank portion 20, so that the grommet may be easily slipped onto the bolt. Preferably, the remaining grommets have similarly tapered internal bores therethrough.

The intermediate subassembly 40 comprises the spacer or spool 32 and the oppositely disposed innermost grommets 26 and 28. The spacer or spool 32 has a tubular body 52 of corrosion-resistant material, which is preferably a tough, strong plastic, such as polypropylene, and, preferably, a 20% glass-filled polypropylene. The tubular body 52 is seamless, and may be economically produced by extruding a tube and cutting a desired length from the extruded stock material. Opposite ends of the tubular body 52 are closed and sealed by end caps 54 and 56. These caps are also molded or otherwise formed from a plastic or corrosion-resistant material the same as or similar to that of the tube 52.

As shown in FIGS. 2, 3, and 4, the end cap 54 has an annular or washer body 58 with an outer diameter similar to the outer diameter of the grommet 26 for providing proper support for the resilient grommet. The annular or washer body 58 is provided with a central aperture 60 having a diameter similar to, and preferably slightly larger than, the diameter of the unthreaded shank portion 20 of the bolt for facilitating assembly with the bolt. As mentioned above, the end cap 54 is adapted to close and effectively seal an end of the tubular body 52. Thus, the body 52 has an outer diameter similar to, but preferably slightly less than, the outer diameter of the washer portion 58, so that there will be sealing and engagement between the washer portion 58 and the end of the tubular body. It is noted that the inner diameter of the tubular body 52 is substantially larger than the diameter of the bolt shank, so as to minimize the thickness of the wall section of the tubular body. At the same time, the relatively large diameter of the tubular body provides rigid support for the periphery of the annular washer body 58 of the end cap.

In order to secure the end cap 54 to the tubular body, protuberances or ribs 62 are integrally molded with the washer or annular body portion 58 and combine together to provide an annular projection extending axially inwardly for connecting the end cap to the body 52. The protuberances or axially extending ribs are spaced around the annular body 58, so that their outer axially extending edges 64 thereof define an imaginary circle having a diameter at least as great as the internal diameter of the tubular body 52. The arrangement is such that when the cap member 54 is to be assembled with the tubular body, the protuberances or rib elements 62 extend into the tubular body and the edges 64 engage the tubular body with an interference fit. Preferably, ends of the ribs or protuberances 62 are beveled, as indicated at 66 in FIG. 4, for facilitating insertion into the tubular body.

It is further to be noted that the ribs or protuberances 62 extend radially inwardly from the edges 64 substantially to the margin of the aperture 60, so as to support the central portions of the annular body 58 and prevent it from collapsing under axial loads applied thereto through the grommet 26. Furthermore, bottom edges 67 of the ribs 62 are inclined axially inwardly from the beveled edges 66 substantially to a margin of the central aperture 60. Thus, the inclined edges 67 are positioned to provide cam surfaces for guiding an end of the bolt through the aperture 60 during assembly of the parts. It is to be understood that the structure of the end cap 56 is preferably identical to that of the end cap 54.

As shown best in FIGS. 2 and 4, the end cap 54 has a thin walled tubular protuberance 68 projecting axially from the margin of the aperture 60 in the annular body 58 oppositely from the ribs or projections 62. The end cap 56 has an identical annular tubular protuberance 70. The internal diameters of the protuberances 68 and 70 are, like the diameter of the aperture 60, similar to but slightly larger than the diameter of the unthreaded shank portion 20 of the bolt 18. This enables the shank of the bolt to be inserted through the end caps easily without undue play or looseness between the parts. The external diameter of the tubular projections 68 and 70 is slightly greater than the minimum diameter of the bores 47 through grommets 26 and 28. The elastic resiliency of the material from which the grommets are fabricated is such as to enable the grommets to be stretched around the protuberances 68 and 70 when the grommets are assembled with the end caps to provide the preassembled subassembly 40. The interference fit between the grommets and the protuberances 68 and 70 is sufficient to maintain the parts in preassembled relationship prior to assembly of the entire end link with the vehicle suspension.

As will be understood from the above description, the end link is preferably supplied to the vehicle assembly line in the form of the three preassembled subassemblies 38, 40, and 42, so as to minimize inventory and handling problems. During installation in the vehicle suspension system, the bolt 16 of the subassembly 42 is first inserted through the aperture in the suspension element 14. Then, the subassembly 40 is applied as a unit to the bolt, after which the bolt may be inserted through the stabilizer bar 12. Finally, the subassembly 38 is applied to the end of the bolt and the nut 34 is tightened until the parts are securely clamped in the finally assembled condition shown in FIG. 1.

Figure 5:
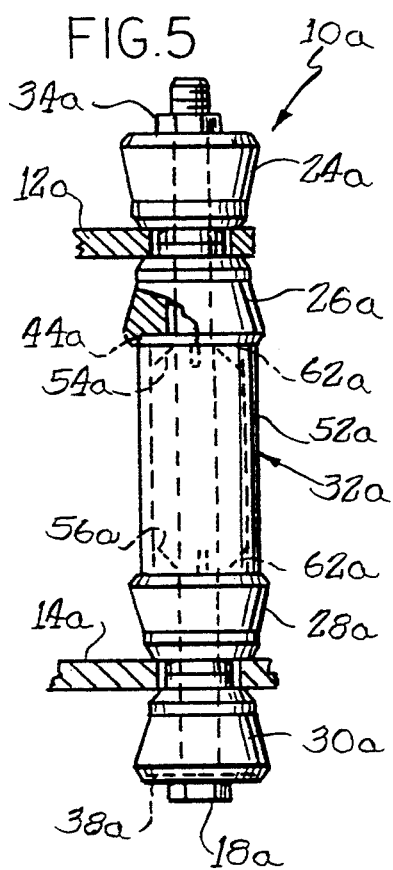
FIG. 5 is an elevational view showing a modified form of the present invention.
Figure 6:
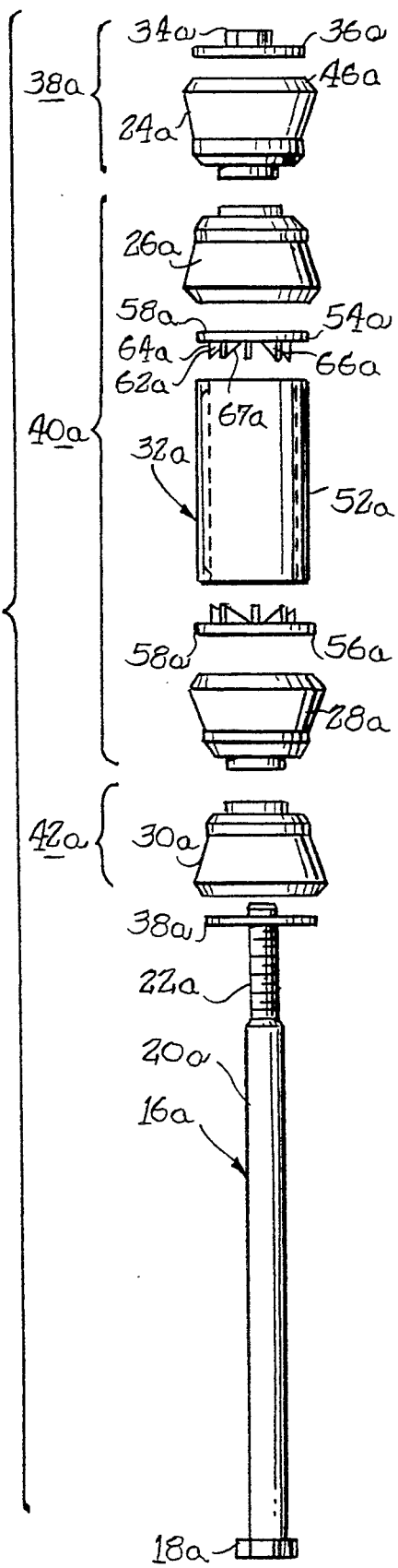
FIG. 6 is an exploded side elevational view of the FIG. 5 structure.

Referring now to FIGS. 5 and 6, another embodiment of the present invention is disclosed, which embodiment is similar to the structure described above, as indicated by the application of identical reference numerals with the suffix "a" added to corresponding parts. In this embodiment, all of the grommets 24a, 26a, 28a, and 30a are essentially identical and are identical to the above-described grommet 24. More specifically, all of the grommets of this embodiment include an end pocket 44a for receiving and retaining a washer. The washers 36a and 38a are respectively snapped into the pockets of the grommets 24a and 30a. The end pockets of the grommets 26a and 28a are snapped onto the annular washer or body portions 58a of the end caps 54a and 56a, respectively. It is to be noted that the annular or washer body portions 58a have a diameter slightly greater than the diameter of the tubular body 52a, so as to present flanges adapted to be trapped within the end pockets of the grommets 26a and 28a. With this arrangement, the grommets 26a and 28a may be easily and quickly snapped into preassembled relationship with the spool or spacer 32a. At the same time, the previously described extensions 68 and 70 may be omitted from the end caps 54a and 56a.

While preferred embodiments of the present invention have been shown and described herein, many structural details may be changed without departing from the spirit and scope of the appended claims. For example, while the grommet 30 in the subassembly 42 is shown as being identical in structure to the grommets 26 and 28, the grommet 30 could be replaced by one identical in the structure to the grommet 28 with the washer 38 preassembled in the end pocket provided in such a grommet. Alternatively, the bolt 16 having an integral head 18 could be replaced by a rod having threaded portions at its opposite ends, and the grommet 30 and washer 38 could be replaced by a subassembly essentially identical to the subassembly 38.

The invention is claimed as follows:

1. An end link for a stabilizer bar of a vehicle suspension system, comprising:
    a rod having a first section of predetermined diameter and a threaded end section, abutment means at an end of said rod opposite from said threaded end section;
    a non-corrodible plastic, hollow tubular impervious body surrounding an intermediate portion of said rod, and having an internal diameter substantially larger than said predetermined diameter of the rod and a predetermined outer diameter;
    an end cap secured to an end of said tubular body, said end cap including an annular portion closing the end of the tubular body, said annular portion having an outer diameter which is similar to the outer diameter of the tubular body and an inner diameter greater than said predetermined diameter of the rod, said end cap including an annular projection extending from a first side of said annular portion into said hollow tubular body and securing the end cap and said body together, said end cap also including a tubular projection projecting from an inner margin of said annular portion oppositely from said annular projection;
    a second annular portion closing an end of said tubular body opposite from said end cap and having an outer diameter similar to the outer diameter of said tubular body, said second annular portion including a tubular projection extending from an inner margin thereof, each of said annular portions having an end surface extending radially outwardly from said tubular projection;
    two first annular grommets of resilient elastomeric material, each of which has an axial bore therethrough and respectively assembled over said tubular projections, each said bore defining a wall, each said tubular projection having a diameter for permitting insertion of said tubular projection into said respective bore, each said tubular projection interengaging the wall of the respective bore and retaining said respective grommet and said tubular body in an assembled relationship and against axial separation;
    each said first grommet having an end engaging said end surface of the respective annular portion radially outwardly of its associated tubular projection;
    two second annular grommets of resilient elastomeric material, each of which has an axial bore therethrough, said second grommets respectively being assembled on said rod in opposing relationship to one of said first grommets;
    first and second washers on said rod and respectively abutting one of said second grommets, said first washer being restrained by said abutment on said rod; and
    a nut threadable onto said threaded end portion in engagement with said second washer.

2. An end link, as defined in claim 1, wherein said annular projection comprises a plurality of annularly arranged, spaced apart, discreet ribs.

3. An end link, as defined in claim 2, wherein said annular projection includes edges disposed in engagement with an interior surface of said tubular body and said ribs extend radially inwardly from said edges substantially to an inner margin of said annular portion for resisting flexing of said annular portion.

4. An end link, as defined in claim 1, wherein said annular projection extends from an imaginary circle concentric with and substantially the same in diameter to an inner wall surface of said tubular body, and extends radially inwardly from said circle substantially to said inner margin of said annular portion.

5. An end link, as defined in claim 4, wherein said annular projection includes inwardly beveled cam surfaces for facilitating installation of said annular projection into said hollow body.

6. An end link, as defined in claim 1, wherein said axial bore through each of said first grommets has a diameter at a first end thereof similar to said predetermined diameter of said rod, and a larger diameter at an opposite end thereof, said first grommets respectively having their first ends stretched and assembled over said tubular projections.

7. An end link, as defined in claim 6, wherein said axial bore of each of said second grommets has a diameter at a first end thereof similar to said predetermined diameter of said rod, and a larger diameter at an opposite end thereof.

8. An end link, as defined in claim 1, wherein said rod comprises a bolt, said abutment means being a head on said bolt.

9. An end link for a stabilizer bar of a vehicle suspension system, comprising:
    first and second opposite ends subassemblies, and an intermediate subassembly;
    one of said first and second subassemblies comprising a rod having a smooth first section of predetermined diameter, a threaded end section, and abutment means on said rod opposite from said threaded end section, a first washer on said rod adjacent said abutment means, and a first grommet on said rod adjacent said washer;
    the other of said first and second subassemblies comprising a second grommet, a second washer associated with said second grommet, and a nut interconnected with said washer and adapted to be threadedly engaged with said threaded end section; and
    said intermediate subassembly comprising a plastic tubular body adapted to be assembled over an intermediate portion of said rod, and having an internal diameter substantially larger than said predetermined diameter of the rod and a predetermined outer diameter, an end cap secured to at least one end of said tubular body, said end cap including an annular portion closing said one end of the tubular body and having an inner diameter greater than said predetermined diameter of said rod and an outer diameter which is substantially the same as the outer diameter of the tubular body, said end cap including an annularly arranged projection extending from a first side of said annular portion into said hollow tubular body with a friction fit and securing the end cap and said body together, said annularly arranged projection comprising a plurality of annularly arranged, spaced apart, discreet ribs, each said rib including edges disposed in engagement with an interior surface of said tubular body and extending radially inwardly from said edges substantially to an inner margin of said annular portion for resisting flexing of said annular portion, third and fourth grommets respectively assembled with said end cap, and located at an opposite end of said tubular body, and interengaging means on said end cap and at said opposite end of the tubular body, and on third and fourth grommets retaining said third and fourth grommets.

10. An end link, as defined in claim 9, wherein said interengaging means comprises a radially thin tubular projection projecting from an inner margin of said annular portion of said end cap, and portions of a bore through said third grommet frictionally engaging over said tubular projection.

11. An end link, as defined in claim 9, wherein said interengaging means comprises an annular end flange on said third grommet snapped over outer margins of said annular portion.

12. An end link, as defined in claim 9, which includes a second end cap substantially identical to said first-mentioned end cap and connected to said opposite end of the tubular body and said fourth grommet.

13. An end link for a stabilizer bar of a vehicle suspension system, comprising:
   a rod having a first section of predetermined diameter and a threaded end section, abutment means at an end of said rod opposite from said threaded end section;
   a non-corrodible plastic, hollow tubular impervious body surrounding an intermediate portion of said rod, and having an internal diameter substantially larger than said predetermined diameter of the rod;
   end caps respectively secured to ends of said tubular body, each of said end caps including an annular portion closing an end of the tubular body, and having an inner diameter greater than said predetermined diameter of the rod, each of said end caps including an annular projection extending from a first side of said annular portion into said hollow tubular body and securing the end cap and said body together, each said end cap also including a tubular projection projecting from an inner margin of said annular portion oppositely from said annular projection;
   two first annular grommets of resilient elastomeric material, each of which has an axial bore therethrough and respectively assembled over said tubular projection on one of said end caps;
   two second annular grommets of resilient elastomeric material, each of which has an axial bore therethrough, said second grommets respectively being assembled on said rod in opposing relationship to one of said first grommets;
   first and second washers on said rod and respectively abutting one of said second grommets, said first washer being restrained by said abutment on said rod;
   a nut threadable onto said threaded end portion in engagement with said second washer; and
   said axial bore through each of said first grommets has a diameter at a first end thereof similar to said predetermined diameter of said rod, and a larger diameter at an opposite end thereof, said first grommets respectively having their first ends stretched and assembled over said tubular projection on one of said end caps.

14. An end link, as defined in claim 13, wherein said axial bore of each of said second grommets has a diameter at a first end thereof similar to said predetermined diameter of said rod, and a larger diameter at an opposite end thereof.

15. An end link as defined in claim 1, which includes a second end cap, said second annular portion being included as part of said second end cap, and said second end cap being substantially identical to said first mentioned end cap.

16. An end link for a stabilizer bar of a vehicle suspension system, comprising:
   a rod having a first section of predetermined diameter and a threaded end section, abutment means at an end of said rod opposite from said threaded end section;
   a non-corrodible plastic, hollow tubular impervious body surrounding an intermediate portion of said rod, and having an internal diameter substantially larger than said predetermined diameter of the rod and a predetermined outer diameter;
   an end cap secured to an end of said tubular body, said end cap including an annular portion closing the end of the tubular body, said annular portion having an outer diameter which is similar to the outer diameter of the tubular body and an inner diameter greater than said predetermined diameter of the rod, said end cap including an annular projection extending from a first side of said annular portion into said hollow tubular body and securing the end cap and said body together, said end cap also including a tubular projection projecting from an inner margin of said annular portion oppositely from said annular projection;
   a second annular portion closing an end of said tubular body opposite from said end cap and having an outer diameter similar to the outer diameter of said tubular body, said second annular portion including a tubular projection extending from an inner margin thereof;
   two first annular grommets of resilient elastomeric material, each of which has an axial bore therethrough and respectively assembled over said tubular projections, each said bore defining a wall, each said tubular projection having a diameter for permitting insertion of said tubular projection into the respective bore, said bore having a smallest dimension at an end which first receives the tubular projection, each said tubular projection interengaging the wall of the respective bore and retaining said respective grommet and said tubular body in an assembled relationship and against axial separation;

two second annular grommets of resilient elastomeric material, each of which has an axial bore therethrough, said second grommets respectively being assembled on said rod in opposing relationship to one of said first grommets;

first and second washers on said rod and respectively abutting one of said second grommets, said first washer being restrained by said abutment on said rod; and a nut threadable onto said threaded end portion in engagement with said second washer.

17. An end link for a stabilizer bar of a vehicle suspension system, comprising:

a rod having a first section of predetermined diameter and a threaded end section, abutment means at an end of said rod opposite from said threaded end section;

a non-corrodible plastic, hollow tubular impervious body surrounding an intermediate portion of said rod, and having an internal diameter substantially larger than said predetermined diameter of the rod and a predetermined outer diameter;

an end cap secured to an end of said tubular body, said end cap including an annular portion closing the end of the tubular body, said annular portion having an outer diameter which is similar to the outer diameter of the tubular body and an inner diameter greater than said predetermined diameter of the rod, said end cap including an annular projection extending from a first side of said annular portion into said hollow tubular body and securing the end cap and said body together, said annular projection comprising a plurality of annularly arranged, spaced apart, discreet ribs, each said rib including edges disposed in engagement with an interior surface of said tubular body and extending radially inwardly from said edges substantially to an inner margin of said annular portion for resisting flexing of said annular portion, said end cap also including a tubular projection projecting from an inner margin of said annular portion oppositely from said annular projection;

a second annular portion Closing an end of said tubular body opposite from said end cap and having an outer diameter similar to the outer diameter of said tubular body, said second annular portion including a tubular projection extending from an inner margin thereof;

two first annular grommets of resilient elastomeric material, each of which has an axial bore therethrough and respectively assembled over said tubular projections;

two second annular grommets of resilient elastomeric material, each of which has an axial bore therethrough, said second grommets respectively being assembled on said rod in opposing relationship to one of said first grommets;

first and second washers on said rod and respectively abutting one of said second grommets, said first washer being restrained by said abutment on said rod; and a nut threadable onto said threaded end portion in engagement with said second washer.

18. An end link as defined in claim 17, which includes a second end cap, said second annular portion being included as part of said second end cap, and said second end cap being substantially identical to said first mentioned end cap.

* * * * *